United States Patent [19]

Smith, III et al.

[11] 4,101,135
[45] Jul. 18, 1978

[54] SOUND REPRODUCING UNIT

[75] Inventors: Jay Smith, III, Pacific Palisades; Richard F. M. Conroy, Woodland Hills, both of Calif.

[73] Assignee: Hasbro Development Corp., Pawtucket, R.I.

[21] Appl. No.: 760,237

[22] Filed: Jan. 17, 1977

Related U.S. Application Data

[62] Division of Ser. No. 471,351, May 20, 1974, Pat. No. 4,010,959.

[51] Int. Cl.² .................................................. G11B 3/78
[52] U.S. Cl. .................................................. 274/39 A
[58] Field of Search ................... 274/1 A, 9 R, 39 A; 74/773, 789

[56] References Cited

U.S. PATENT DOCUMENTS

| | | | |
|---|---|---|---|
| 2,353,370 | 7/1944 | Sears | 74/789 |
| 2,467,627 | 4/1949 | Olson | 74/773 X |
| 3,082,006 | 3/1963 | Ryan | 274/1 A |
| 3,801,110 | 4/1974 | Licitis | 274/42 R |
| 3,904,210 | 9/1975 | Licitis | 274/1 A |

Primary Examiner—Harry N. Haroian
Attorney, Agent, or Firm—Salter & Michaelson

[57] ABSTRACT

A voice or sound unit adapted for use on toys and the like has a mechanical linkage system with a joint capable of transmitting sound indicia while isolating the tone arm from any absorption of stylus movement. The tone arm can employ flexure hinges to insure a constant force on the stylus. A planetary gear coupling system provides a unique drive transmission to either a single turntable or a pair of concentric turntables. If a pair of turntables are used, they can be relatively rotated to combine a large number of sound sequences.

17 Claims, 10 Drawing Figures

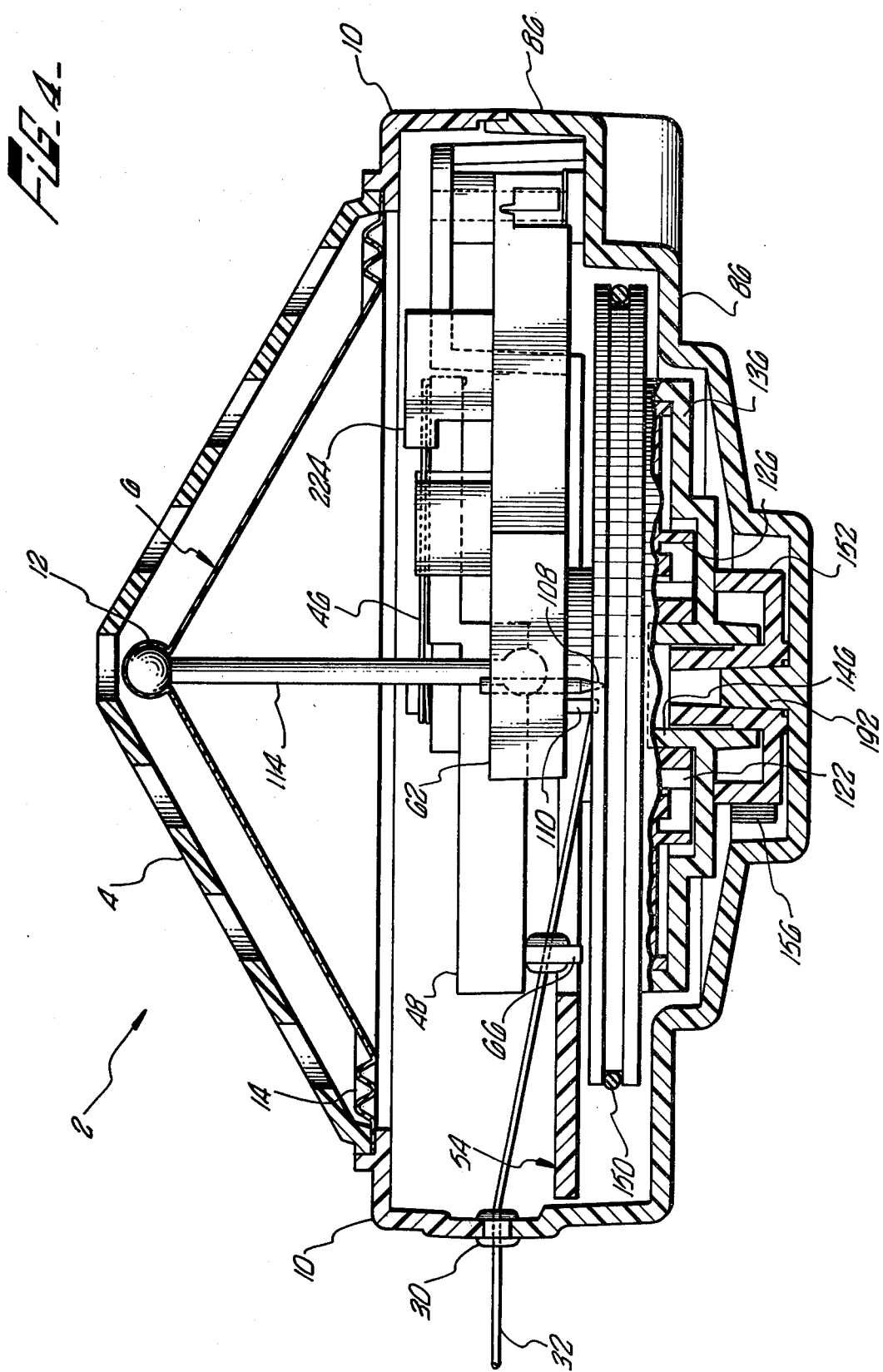

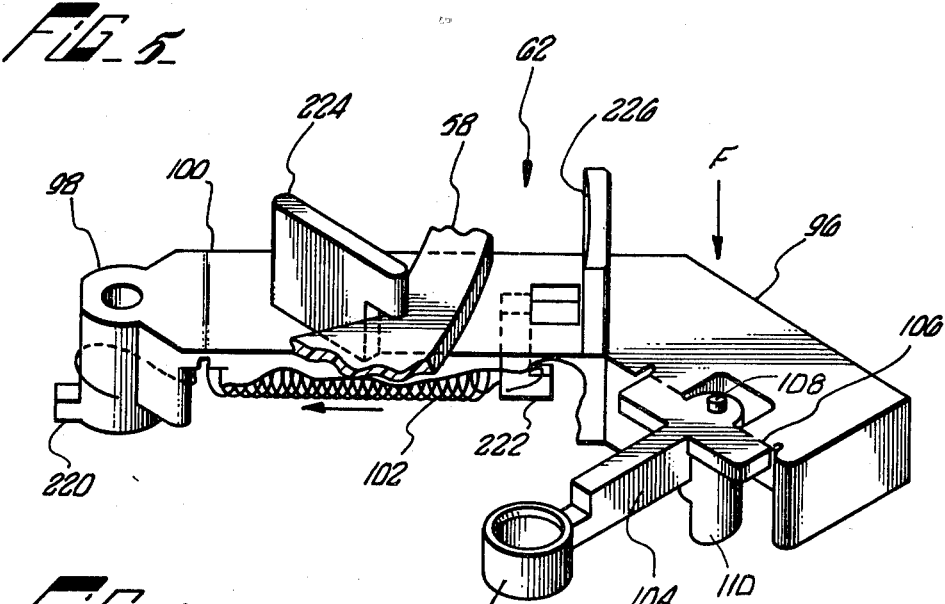
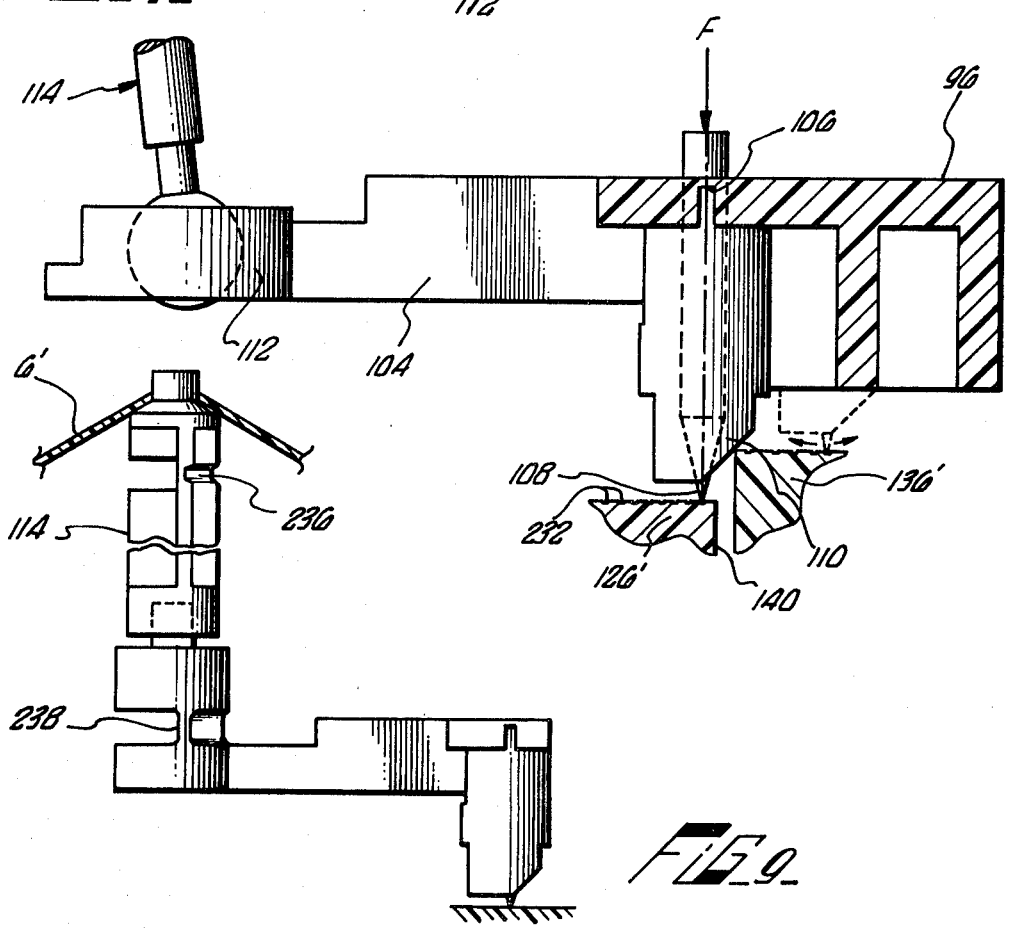

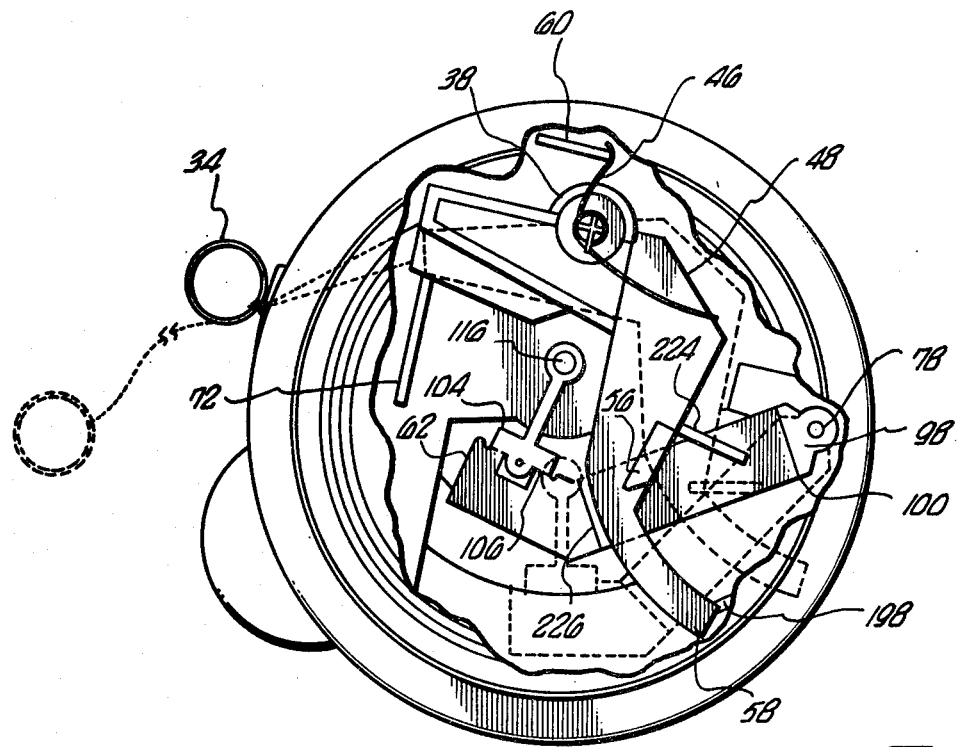
FIG_8_
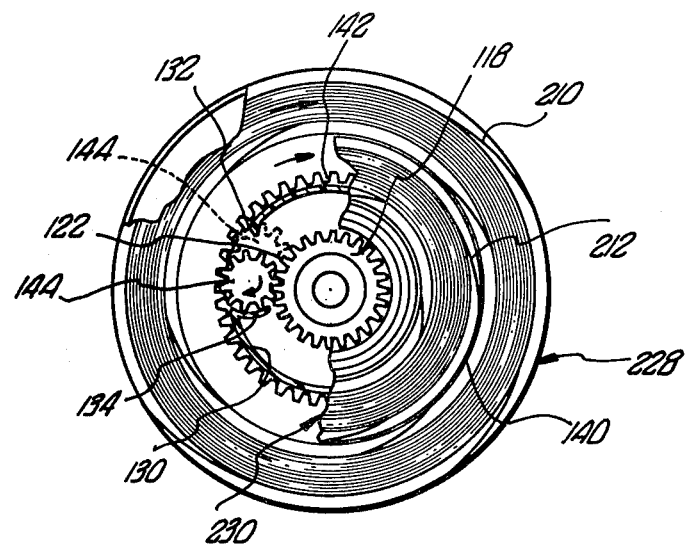
FIG_6_

SOUND REPRODUCING UNIT

This application is a division of Ser. No. 471,351 filed May 20, 1974 now U.S. Pat. No. 4,010,059 and entitled SOUND REPRODUCING UNIT.

BACKGROUND OF THE INVENTION:

1. Field of the Invention

This invention relates to improvements in a voice or sound unit which is capable of producing sounds, for example, of the type associated with toys and the like. In particular, the present invention relates to improvements in both the arrangement of component parts and the structural design of the parts to provide ease of manufacturing, improved sound quality and a new form of voice unit highly adaptable to numerous applications.

2. Description of the Prior Art

Phonographs and other forms of sound producing devices can be broadly described as voice units and have found numerous applications particularly in the field of toys. Voice units have been utilized in various forms of talking dolls, music boxes, games, etc. Early examples of the use of mechanically actuated voice units can be found in the Franklin U.S. Pat. Nos. 1,979,067, Shulman 1,837,076 and Hunter 1,485,137.

In the quest to provide high fidelity sound reproduction with relatively inexpensive parts, various components of voice units have been subject to considerable design efforts. For example, various mechanical arrangements have been utilized for the release of stored energy usually from a source such as a spring. Examples of these arrangements can be found in the Poppe U.S. Pat. Nos. 1,494,802, folk 1,503,787, Grubman 1,979,068 and Marshall 3,568,802. Since the quality of sound reproduction is directly related to the speaker cone, efforts have been made to provide various improved speaker cone configurations and mounting arrangements within the voice unit's housing such as the Chang U.S. Pat. No. 3,547,448. In addition, various forms of spring biased tone arms have been suggested and utilized in the prior art such as the tone arm disclosed in the Scoparino U.S. Pat. No. 3,235,266.

Recently, talking dolls have enjoyed considerable commercial success by employing a multi-speech voice unit that is activated by a pull string. Basically, this comprises the use of a multi-spirally tracked record on a spring driven turntable. Multi-track records have been known in the prior art for a considerable period of time, for example, in the records disclosed in the Berliner U.S. Pat. Nos. 936,976, Abramson 2,703,241, Winchell 3,110,501, Haltenhof 2,287,240, and Michetti 3,332,690. Various examples of multi-speech voice units can be found such as the Greenlee, Jr. U.S. Pat. Nos. 3,325,916, Weld 2,680,150 and Ryan 3,017,187 and 3,082,006.

Besides the use of spirally grooved records, the prior art has also resorted to tapes and rotating drums that are frequently driven by either mechanical means or electrical motors such as the Freeman et al U.S. Pat. Nos. 3,239,229 and the Poylo et al 2,947,978.

Basically, the prior art has experienced some limited success in providing mechanically actuated voice units having a relatively limited vocabulary. However, the provision of a compact, relatively inexpensive voice unit having a relatively large number of sentences that are reproducible in a distortionfree manner has eluded the prior art to date.

SUMMARY OF THE INVENTION

The present invention provides a novel sound unit embodying a number of features which insure a high fidelity sound reproduction at a relatively low cost. The sound unit speaker system employs a unique speaker cone having a mechanical linkage system for transmitting sound indicia from a recording medium. The speaker cone can be molded to accept either a ball joint or flexure hinge connection to a uniquely isolated stylus arm.

Flexure hinges are utilized on the tone arm to isolate the mechanical link system for the transmission of the sound producing motion to the speaker cone. The particular mounting of a tone arm tension spring allows relatively large movements of the tone arm with very small changes in spring pressure exerted against the record grooves.

A planetary gear coupling system provides a unique drive transmission between a spring drive and either a single turntable or inner and outer turntables. If inner and outer turntables are used, a pair of records can be relatively moved to provide a large number of sound sequences.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 2A is a perspective view of the underside carrier portion of the turntable disclosed as one of the components in FIG. 2;

FIG. 4 is a side cross sectional view of an assemblied voice unit;

FIG. 5 is a perspective view of the tone arm with a side wall cut away to disclose a bias spring;

FIG. 6 is a plan view of the turntables with records mounted thereon and parts broken away to disclose the operative positions of the planetary gear;

FIG. 7 is a partial side cross sectional view of the tone arm and records;

FIG. 8 is a plan view of the voice unit with parts broken away to disclose the operative positions of the tone arm and reset arms; and FIG. 9 is a side cross sectional view of an alternative embodiment of the linkage system of the present invention.

DESCRIPTION OF THE PREFERRED EMBODIMENT

Figure 1:
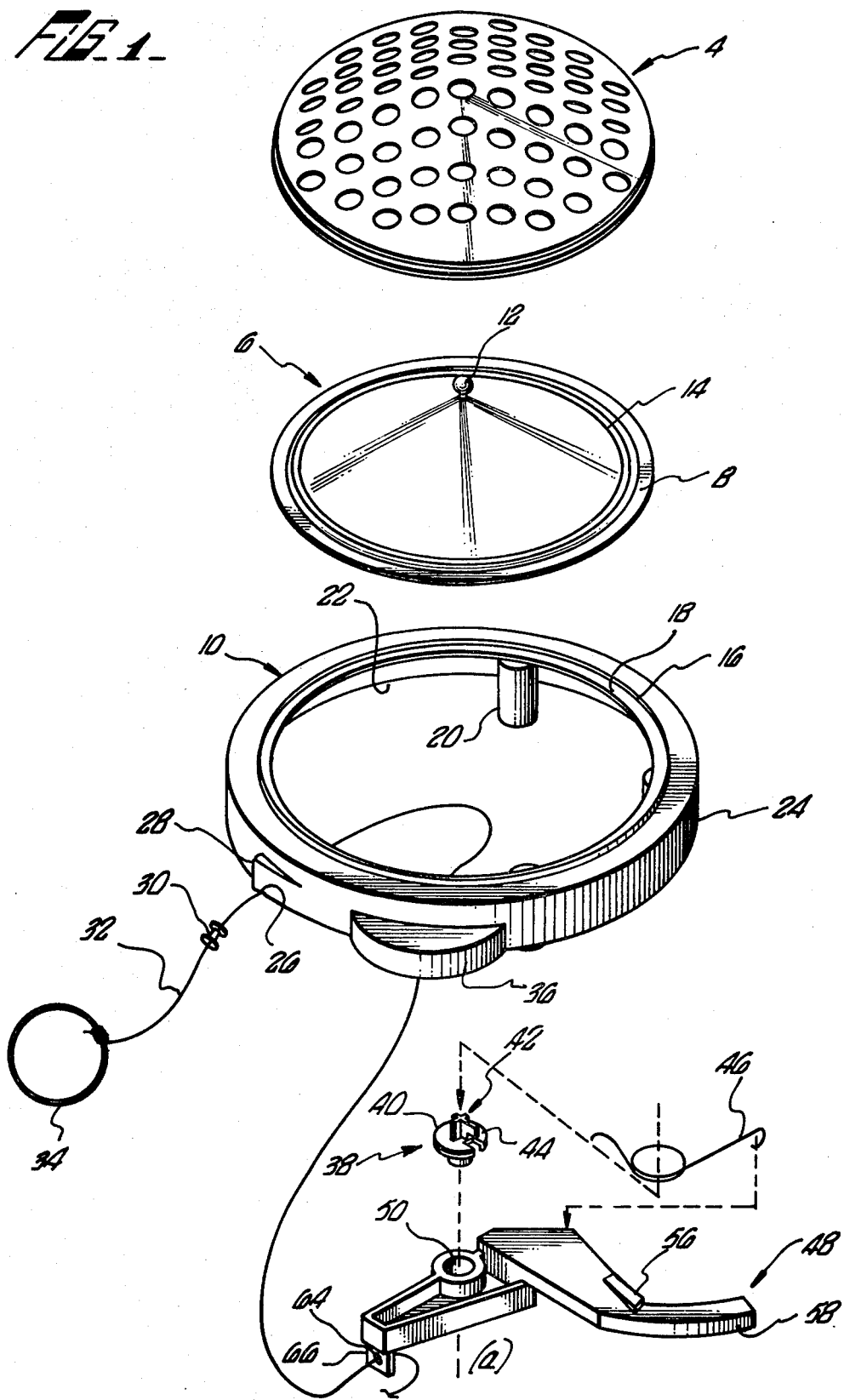
FIG. 1 is the first of a series of three drawings that collectively disclose an exploded perspective view of the voice unit of the present invention.

The following description is provided to enable any person skilled in the art to make and use the invention and it sets forth the best mode contemplated by the inventors of carrying out their invention. Various modifications, however, will be made readily apparent to those skilled in the art since the generic principles of the present invention have been defined herein specifically to provide a relatively economical and easily assemblied voice unit.

Referring to FIGS. 1, 2, 2A, and 3, the various elements of the present invention will be described in a sequential manner to assist the reader in understanding the invention. Most of the component parts utilized in the voice unit 2 of the present invention can be molded from various plastics but other material can be utilized within the parameters of the invention.

A speaker grill 4 is provided primarily to protect a speaker cone 6. The speaker grill 4 has a conical shape with an array of circular holes to facilitate the transmission of sounds from the speaker cone 6. The outer peripheral edge of the speaker grill 4 is flat and is adapted to seat upon the speaker cone rim 8. Alternatively, the grill 4 can be integrally molded with an upper or top housing member 10. The speaker cone 6 is mounted along its rim 8 to the upper or top housing member 10, for example, by an appropriate solvent adhesive. The center or apex tip 12 of the speaker cone 6 has preferably a spherical female ball joint shape with an interior opening on the concave side of the cone 6. The purpose of the spherical ball joint tip 12 will be discussed subsequently.

Concentric ring protrusions or grooves 14 positioned on the surface of the speaker cone 6 about the peripheral rim 8 are provided to insure an acoustical resonance in the mounting of the speaker cone 6 and to improve the sound producing qualities of the speaker cone 6. The ring grooves 14 provide the maximum flexibility to the peripheral portions of the speaker cone 6 thereby permitting the maximum amount of cone sound inducing movement. The result is to induce speaker cone 6 movement which will lower the resonant characteristics of the voice unit 2. The speaker cone is preferably as light as possible and can be vacuum or pressure formed from a sheet of thin heated plastic in an appropriate mold.

The top housing member 10 includes an alignment rim 16 for receiving the speaker grill 4. The alignment rim 16 surrounds a support flange 18 which is adapted to receive the speaker cone rim 8 and accordingly center the speaker cone 6 in the housing member 10. An appropriate adhesive can be positioned on the support flange 18 for securing the speaker cone 6 to the top housing member 10.

As one method of fastening the voice unit 2 together a series of cylindrical securement bosses or columns 20 are mounted on the interior of the top housing member 10. In the disclosed embodiment, four of these bosses 20 are arranged about the internal peripheray of the top housing member 10 and are adapted to receive thread inserts (not shown) for coacting with appropriate fasteners such as screws (not shown). Alternatively, the voice unit 2 can simply be glued together with an appropriate solvent. A shoulder 22 extends substantially around the interior of an outer wall 24 of the top housing 10 for alignment with a matching component on a lower housing member. A semi-circular notch 26 is provided on a ramp 28 of the outer wall 24 and is designed to receive a guide sleeve or eyelet 30 for permitting the relative movement of a pull string 32 into and out of the voice unit 2. A pull ring 34 can be conveniently attached to the pull string 32 both to assist an operator in applying a force to the pull string 32 and further to serve as a stop or limit to the movement of the pull string 32 into the voice unit 2 by contacting the ramp 28. Finally, a semi-circular top governor housing cavity portion 36 is integrally molded into the outer wall 24 of the top housing member 10.

A reset arm retainer plug 38 includes an upper circular flange 40 that supports a cross sectionally X-shaped spring retainer 42 having a cantilevered leg 44. The center helix of a reset arm spring 46 is adapted to fit over and be retained by the cantilevered leg 44.

Figure 2:
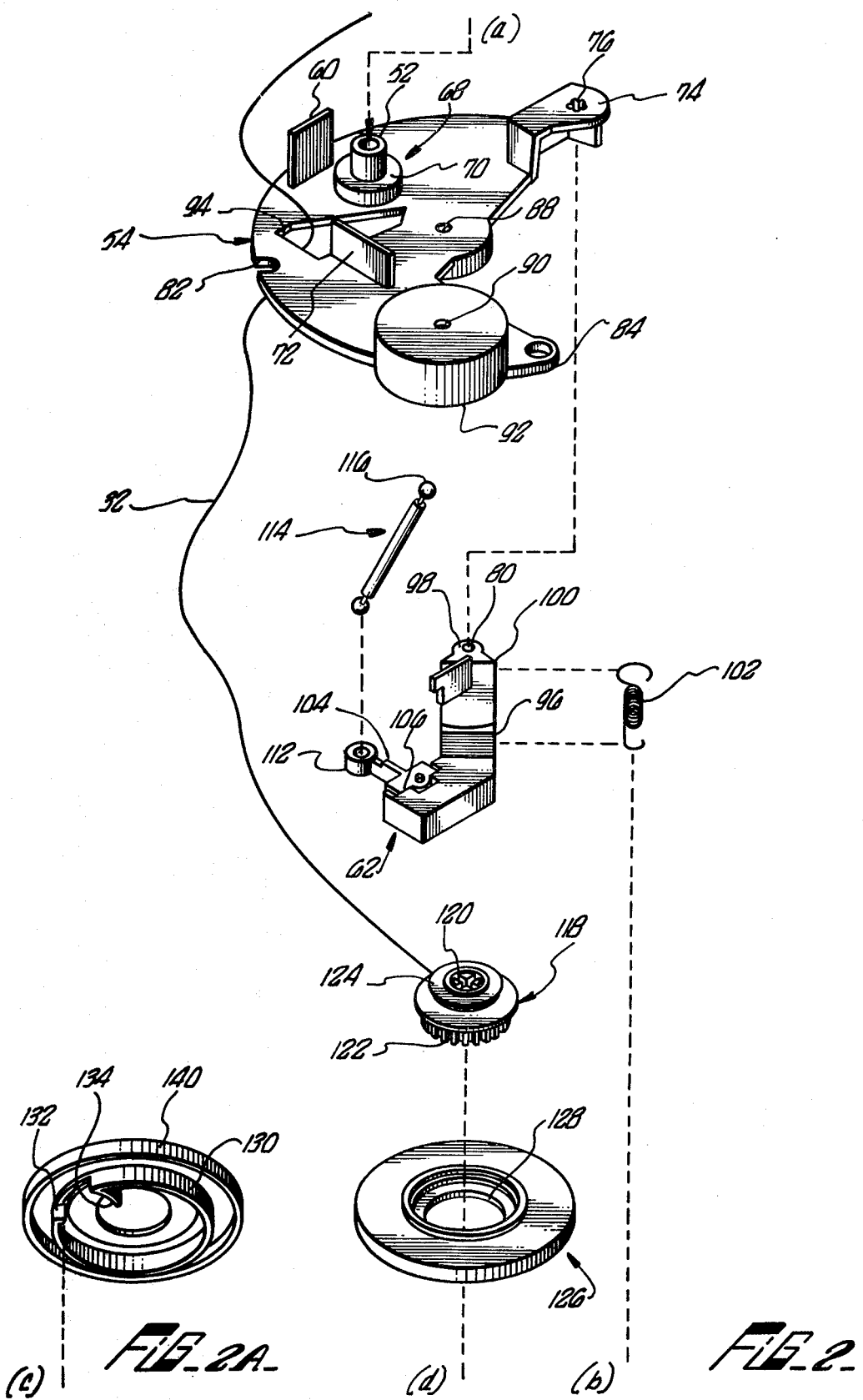
FIG. 2 is the second drawing of the series of three drawings showing an exploded perspective view.

The reset arm 48 has an appropriate bore 50 for receiving the reset arm retainer plug 38. The reset arm retainer plug 38 is adapted to be press-fitted within an appropriate bore 52 mounted on the motor cover plate 54 as seen in FIG. 2. Alternatively, the plug 38 and bore 52 can be designed to provide a snap-in engagement or re-designed to remove the necessity of a plug 38, for example, by having the reset arm 48 directly snapped into the motor cover plate 54. The assembly and alignment of each of the respective parts of the voice unit 2 can be determined from the dotted trace lines.

The reset arm 48 has an appropriate cam ramp 56 adjacent a movement limiting pawl 58. The reset arm spring 46 has one spring end attached to a side exterior surface of the reset arm 48 and another spring end adapted to be held stationary by a spring support member 60 extending upward from the surface of the motor cover plate 54. The permissible movement of the reset arm 48 is determined by the coaction of the pawl 58 with the tone arm 62. The pull string 32 passes through a hole 64 in a lower flange 66 of the reset arm 48.

Referring again to the motor cover plate 54 of FIG. 2, the bore 52 for receiving the retainer plug 38 is located in a tubular support member 68 having a lower flange 70 to provide a bearing surface for the pivotal movement of the reset arm 48. A vertical wall member 72 can serve as a stop or limit to the pivotal movement of the reset arm 48 by contacting a portion of the reset arm 48 adjacent the flange 66. A retainer plate 74 is elevated from the surface of the motor cover plate 54 and has a grooved bore 76 adapted to receive stud 78 shown in FIG. 3 which also provides a pivotal connection to the tone arm 62 when it passes through a bore 80 in the tone arm 62. The retainer plate 74 maintains the tone arm 62 on the stud 78.

Figure 3:
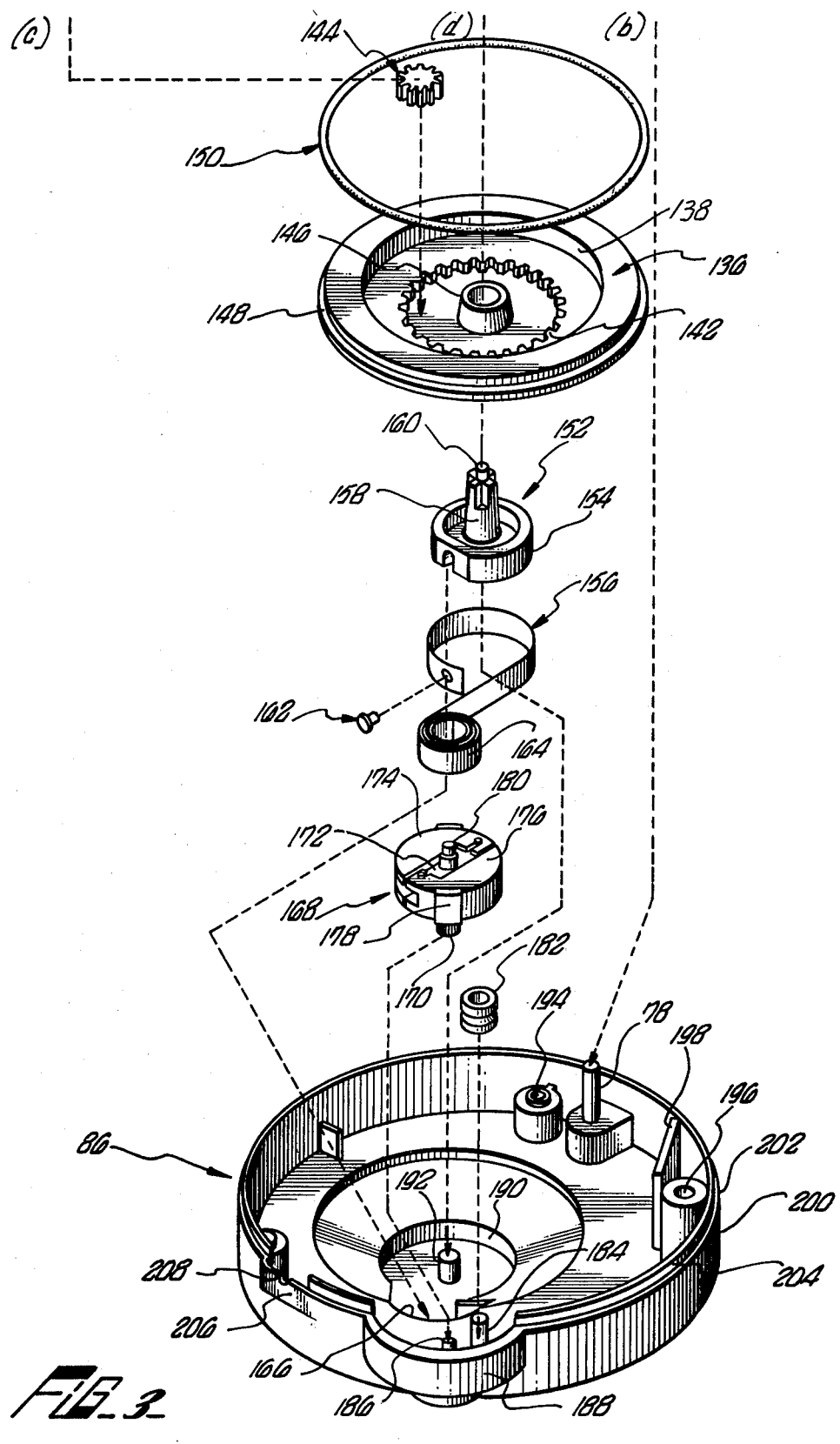
FIG. 3 is the third drawing of the series of three drawings showing an exploded perspective view of the voice unit of the present invention, FIGS. 1, 2, and 3 can be aligned in sequential order to disclose the full exploded view of the components of the present invention.

A peripheral notch 82, a retaining ear 84 and a hole (not shown), located behind the retaining plate 74 in FIG. 2, provide alignment points for the motor cover plate 54 when it is mounted within the lower housing member 86 shown in FIG. 3. An alignment hole 88 in the motor cover plate 54 and an additional alignment hole 90 in a governor housing member 92 are adapted to align appropriate shafts of components to be discussed subsequently. A wedge shaped opening 94 is provided in the motor cover plate 54 to permit freedom of movement of the pull string 32 as it extends through the motor cover plate 54 and is driven through an arc movement by the reset arm 48.

The tone arm 62 comprises three separate and relatively movable parts which can be seen in detail in FIGS. 5, 7 and 8. The tone arm 62 has a dog-legged shaped elongated body 96 with a mounting post 98 at one end and a stylus or needle mounting arm 104 at the other end. The dog-legged shape insures a tangential alignment of the stylus mounting arm 104 with the record tracks to optimize the pickup of sound indicia from a push-pull or horizontal side to side cut record groove.

The tone arm 62 is molded of plastic and has a "living hinge" or flexure necked-down portion 100 connecting the mounting post 98 with the elongated body 96. The mounting post 98 includes the bore 80 for receiving the mounting stud 78 from the lower housing member 86. The flexure or "living hinges" 100 are known in the prior art of plastic molding and in essence comprise a thin necked-down portion approximately 15 to 20 thousandths of an inch in thickness and 30 thousandths of an inch in width that is relatively free of stress and backlash and is capable of a large number of repetitive pivotal movements. Of prime importance the flexure hinges 100 are capable of translating all the motion imposed on the hinge, that is, it will not lose any sound indicia.

The elongated body 96 has essentially a U-shaped cross sectional configuration with the bottom surface relatively open. Mounted within the elongated body 96 and connected to the mounting post 98 is a tone arm spring 102. The purpose of the tone arm spring 102 is to insure a downward pressure or force on the stylus mounting arm 104 when the mounting post 98 is restrained in movement by the mounting stud 78.

The stylus mounting arm 104 is connected to the elongated body 96 by a pair of living hinges 106. The living hinges 106 permit a stylus or record needle 108 mounted in the stylus mounting arm 104 to have a relatively free pivotal movement independent from the elongated body 96. This is accomplished by mounting the stylus 108 along the axis of the flexure hinges 106. Actually as can be seen from FIG. 7, it is the contact point of the stylus 108 with the record which should optimally be in the vertical plane of the two hinges 106 to effectively minimize any mechanical coupling of the sound indicia into the tone arm 62. The particular use of the no lost motion flexure hinges 106 permits the stylus 108 and mounting arm 104 to provide a bell crank effect in converting the lateral or horizontal needle motion to a vertical linkage motion to the speaker cone 6. Interestingly, this tone arm arrangement can also perform satisfactorily with a record groove cut with a hill and dale or vertical sound indicia arrangement upon an appropriate re-alignment of the tone arm 90 degrees rotated from the disclosed embodiment relative to the record groove.

As can be seen from FIG. 7, a camming ramp 110 is provided on the stylus mounting arm 104 to extend adjacent the pointed end of the stylus 108. The camming ramp 110 is so positioned relative to the tip of the stylus 108 and the relative height of the interface area of two concentric records to contact the edge of the upper record when the stylus 108 tracks off the upper record and to translate the stylus 108 independent of the record's interface onto the lower record. Thus, the camming ramp 110 permits the stylus 108 to track across two concentric records without becoming stuck or captured in the opening or interface of the records.

A female ball joint or coupling member 112 is designed to provide a swivel connection with a male speaker link 114. The speaker link 114 comprises a rod-like body having a spherical ball 116 mounted at either end of the link body. It has been found desirable to utilize a relatively light weight plastic such as a polypropylene having a specific gravity of about 0.9 for the link 114. While heavier plastics have better sound transmission characteristics, their heavier mass adversely effects the linkage system of the present invention. The respective ball portions 116 of the speaker link 114 are adapted to be mounted respectively in the joint or coupling member 112 of the stylus mounting arm 104 and the female joint 12 at the apex or tip of the speaker cone 6. The effect of the ball and joint coupling permits a universal motion to the speaker link 114 while efficiently transmitting all of the sound vibrations that are induced into the stylus mounting arm 104 via the record stylus 108. The female coupling joint 112 can further be of a split ring configuration (not shown) to further insure a pressure bias on the coupling joint 112 that prevents any loss of sound indicia motion.

A combination string spool and sun gear 118 has a central bore opening 120 of a cross bar configuration. The lower portion of the spool 118 carries the sun gear 122. A flange 124 retains the pull string 32 as it progressively rewinds on the spool during the voice reproduction operation of the voice unit 2.

While it is possible to utilize many features of the present invention on a single turntable voice unit, the following disclosure is directed to its application on a dual turntable voice unit. An inner turntable 126 has a central cavity or bore 128 for receiving and being held in position by the particular mounting of the string spool 118. Referring to FIG. 2A, the underside of the inner turntable 126 has an inner protruding annular rail or carrier member 130 terminating at one end in an enlarged tooth member 132 and at the other end in a gear retaining wall 134. The outer edge of the inner turntable 126 has a cylindrical bearing rim 140.

Referring to FIG. 3, the inner turntable 126 is adapted to be mounted recessed within the cavity of an outer turntable 136 for concentric relative rotation. A shoulder portion 138 on the outer turntable 136 seats the outer peripheral bearing rim 140 of the inner turntable 126 at a spaced apart distance from the outer turntable 136. A mounting flange 146 is centrally located in the outer turntable 136 cavity for seating the string spool 118 as shown in FIG. 4. The periphery of the outer turntable 136 can have an annular groove 148 for receiving an O-ring rubber drive belt 150. Alternatively, a record can be mounted on the turntable 136 and form one flange of the groove 148. The respective inner and outer turntables 126 and 136 can be made of nylon and have sound tracks or grooves, as shown in FIG. 7, directly cut onto the turntable disk faces and thereby remove the necessity of records completely.

The annular rail or carrier member 130 extends downward into the secondary cavity of the outer turntable 136 adjacent a ring gear portion 142 of the outer turntable 136. A planetary gear 144 is restrained within the secondary cavity of the outer turntable 136 between the tooth member 132 and the gear retaining wall 134. The operation of the planetary gear 144 which can permit relative rotation between the inner turntable 126 and the outer turntable 136 will be subsequently described.

A spring spindle 152 has a lower cylindrical portion 154 for supporting a constant tension main spring 156. A shaft 158 extends upward from the ring portion 154 to provide a complementary cross bar shape for receiving the bore 120 on the string spool 118. A circular stud 160 on the shaft 158 is adapted to be received within the alignment hole 88 of the motor cover plate 54. A rivet or the like 162 can be utilized to fasten the main spring 156 to the ring portion 154 of the spring spindle 152. The constant tension coil 164 of the main spring 156 is adapted to be received within a retaining cavity 166 in the lower bottom housing 86. Mylar washers (not shown) can be utilized on either side of the main spring 156 to isolate any sharp edges from contact with plastic components.

A governor assembly 168 includes a mounting shaft 170 supporting a central mounting flange 172 that pivotally mounts a pair of brake shoes 174 and 176. Each brake shoe carries a respective brake pad 178 which can be simply a felt pad for frictionally bearing against the inner wall of the governor housing member 92 on the motor cover plate 54. An upper stud member 180 on the shaft 170 is adapted to be positioned within the alignment hole 90 on the governor housing member 92.

A guide roller 182 having a central annular groove about its surface is adapted to be mounted on a stud support 184 extending from the surface of the lower bottom housing 86. An adjacent stud 186 centrally located within the governor cavity wall 188 of the lower housing member 86 is designed to fit within a bore (not shown) in the mounting shaft 170. The drive belt 150 is operatively mounted on the groove 148 of the outer turntable 136 and extends around the mounting shaft 170. The guide roller 182 tensions the drive belt 150 between the mounting shaft 170 and the outer turntable 136 and further increases the effective wrap about the shaft 170. When the governor assembly 168 is rotated by the drive belt 150, during the operation of the respective turntables 136 and 126, each of the governor brake shoes 174 and 176 pivot away from their mounting flange 172 as a result of the centrifugal forces exerted upon them. The brake shoes 174 and 176 may optionally have a spring biasing them against the mounting flange 172. The pivoting motion forces the brake pads 178 to bear against the inner wall of the governor housing 92 and thereby regulate the rotational speed of the respective turntables. Centrally mounted within the spring spindle cavity 190 is a stud 192 for receiving the spring spindle 152.

A plurality of tubular columns 194 having central bores 196 are adapted to receive fastening screws (not shown) therethrough for connection with the securement columns 20 on the upper housing member 10. Alternatively, the upper and lower housing members can be held together by a solvent adhesive.

A bearing wall 198 extends upward from the bottom housing member 86 to support the end of the pawl 58 of the reset arm 48. The lower bottom housing wall 200 further provides a shoulder 202 for receiving an edge of the upper housing outer wall 24. Internal shoulder 22 on the upper housing member 10 receives the rim 204 of the lower bottom housing member 86. A lower ramp 206 has an appropriate half-circular notch 208 to coact with the upper ramp 28 for forming a stop for the pull ring 34.

COMPONENT OPERATION

1. Tone Arm Operation

Referring to FIGS. 5 and 8, the tone arm 62 is disclosed in its operative mode. As noted earlier, the tone arm 62 comprises an elongated body member 96 having a hinged mounting post 98 at one end and a stylus mounting arm 104 at the other end. A flexure or "living hinge" 100 connects the mounting post 98 with the elongated body 96. Basically, a "living hinge" is a necked down or thin section of plastic that has a minimal amount of plastic memorey or "set" relative to its designed direction of rotation. The necked down section is relatively free of stresses and capable of a large number of cyclic operations, well within the normal life of the tone arm 62 without losing any voice indicia motion transmitted across the hinge. A tone arm spring 102 is interconnected between an ear portion 220 of the mounting post member 98 and a mounting stem 222 on the elongated body member 96. The tone arm spring 102 creates a bias or downward force of about 50 grams that provides the proper tension force to the stylus 108.

As can be appreciated by the particular mounting of the tone arm spring 102, the elongated body portion 96 can have a relatively large degree of movement in the vertical plane compared to the mounting post 98 on its stud 72 while still providing a relatively constant spring tension or force on the stylus 108. Thus, as the stylus or needle 108 is translated by a camming action from the outer record 228 to the inner record 230 independent of the interfacing gap, that is horizontally inward and vertically downward, the relative relaxation of the tension in the tone arm spring 102 is minute and the respective tone arm force translated to the stylus or needle 108 remains virtually constant from the outer to the inner records.

By providing the pair of flexure or living hinges 106 between the stylus mounting arm 104 and the elongated tone arm body 96, the present invention insures a relative free movement of the stylus or needle 108 for tracking the sound path in the appropriate spiral groove track and further translating this movement along the arm 104 to the speaker cone 6 through the speaker link 114. As mentioned earlier, the stylus point contact in the vertical plane of the pair of flexure hinges 106 minimizes any sound indicia movement coupling into the tone arm 62.

A cam follower arm 224 is provided on the surface of the tone arm elongated body member 96 for contact with the reset arm 48. In addition, an arcuate shaped stop member 226 is also provided on the body member 96. The reset arm pawl 58 is designed to move between the cam follower arm 224 and the arcuate stop member 226 depending upon the tension exerted on the pull string 32. The contact of the pawl 58 with the arcuate stop member 226 further insures a stable or relatively vibration free state for the tone arm 62 to help insure an isolation of the speaker linkage system from the rest of the voice unit 2. While not necessary, a grease such as silicone grease can be provided on the interface of the pawl 58 and the stop member 226.

Referring to FIG. 8, the relative position of the tone arm 62 and the reset arm 48 are disclosed in various operative modes. The solid drawing lines disclose the relative position of the tone arm 62 and the reset arm 48 at their end of travel in a rest position after playing one discrete sequence of combined sounds from the inner and outer records. The dotted lines disclose the relative positions after the pull string 32 has been extended to its full length. The reset spring 46 tends to bias the reset arm 48 to that position shown in the solid lines of FIG. 8. While not shown, it would be possible to design the reset arm 48 with an integral plastic spring which would eliminate the need for an extra steel wire spring 46.

During the initial tensioning of the pull string 32, the reset arm 48 is rotated and the cam ramp 56 contacts the cam follower arm 224 on the tone arm 62 to raise the tone arm 62 and correspondingly the stylus or needle 108 from contact with an inner record 230 shown in FIG. 6. As the tension force on the pull string 32 overcomes the bias of the reset arm spring 46, the cam ramp 56 pivots the tone arm 62 to the desired initial operative position as shown in the trace lines of FIG. 8. The pawl 58 of the reset arm 48 is supported throughout its travel on a bearing wall 198 extending upward from the lower housing member 86. When the tension on the pull string 32 is released, the reset spring 46 forces the arcuate outer surface of the pawl 58 against the arcuate stop member 226 on the tone arm 62. In this position, the tone arm 62 is free to track inwardly on the spiral grooves respectively on the inner and outer records.

2. Planetary Gear Operation

Referring to FIGS. 4 and 6, when an operator pulls the string 32, he rotates the spring spindle 152 which, in turn, unwinds or reverse winds the coil 164 of the negator or constant tension main spring 156. The coil 164 has been stored or held passive in a retaining cavity 166 on the lower bottom housing member 86 partially disclosed in FIG. 3. Since the spring spindle 152 is interconnected via the shaft 158 with the string spool 118, the sun gear 122 portion of the string pool 118 is rotated with the movement of the pull string 32. This rotation of the sun gear 118 in turn drives the planetary gear 144. The planetary gear 144 is disclosed in FIG. 6 in its relatively free rotatable state in solid lines and also in its locked state in dotted trace lines.

During the pulling of the string 32, the planetary gear 144 is driven to rotatably contact the gear retaining wall 134 of the inner turntable 126 which can be seen in more detail in FIG. 2A. The orbiting motion of the planetary gear 144 about the center of axis of the sun gear 122 is directly translated via the gear retaining wall 134 to the inner turntable 126 and accordingly rotates the inner turntable 126. The ring gear portion 142 of the outer turntable 136 and the turntable itself remains relatively stationary due to both inertia and friction forces between the governor assembly 168, the drive belt 150, the guide roller 182 and the outer groove 148 of the outer turntable 136. As the pull string 32 is removed from its spool 118 and, in turn, rotates the sun gear 122 the inner turntable 126 likewise rotates relative to the outer turntable 136 as determined by the gear ratio. This rotation can insure positioning of any inner record spiral grooves 212 relative to outer ring record spiral grooves 210 if the dual turntable embodiment of the invention is used.

When the pull string 32 is released by the operator, the negator or constant tension spring 156 seeks to return to a coiled position and accordingly drives the spring spindle 152 in an opposite direction. Again, the string spool 118 and sun gear 122 are likewise driven and this causes the planetary gear 144 to orbit in the opposite direction. When the planetary gear 144 contacts the tooth member 132 of the carrier portion as shown in the trace lines of FIG. 6, the planetary gear 144 serves to relatively lock the ring gear 142 and accordingly the outer turntable 136 to the inner turntable 126. The stored force in the constant tension spring 156 is sufficient to overcome the inertia and frictional forces that previously held the outer turntable 136 and accordingly the planetary gear 144, the inner turntable 126 and the outer turntable 136 are all orbited about the axis of the driving sun gear 122.

With the inner and outer turntables relatively locked and driven, the stylus or needle 108 can accordingly track the appropriate sound grooves in the outer and inner records as they move relative to the tone arm 62. If it is desired to use a single turntable, either the outer or inner turntable could be utilized. Referring to FIGS. 2 and 3, it can be seen that the outer turntable 136 could be enlarged and the inner turntable 126 eliminated leaving only the carrier portion with the tooth member 132 and the gear retaining wall 134.

3. Speed Control Mechanism

Basically, the relative speed of one or more turntables is controlled by a centrifugal governor assembly 168. In addition, the use of a negator or constant tension main spring 156 further provides some speed control because of the relatively constant torque force. An applicable negator or constant tension spring 156 can be purchased from the Hunter Spring Company of Lansdale, Pennsylvania.

While it is possible to utilize other forms of governor assemblies such as an air paddle, the preferred embodiment utilizes a pair of brake shoes 174 and 176 which carry brake pads 178 for bearing against the inner wall surface of the governor housing 92. The governor assembly 168 serves a secondary function as a fly weight in the drive system. Thus, a constant rotation of speed of one or more turntables is achieved with the use of a constant tension drive spring 156 and a centrifugal governor assembly 168 which is of the flywheel friction governor type. The speed control mechanism of the present invention is adequate to control wow and flutter and to permit relatively good fidelity and volume in the voice unit 2.

4. Speaker Cone System

The speaker cone 6 is basically a thin conical plastic shell which can be pressure or vacuum formed to provide a conical ball joint 12 at its apex. A series of peripheral ring grooves 14 are provided to maximize the peripheral flexibility of the speaker cone 6 and accordingly lower the resonance. The mechanical movement or vibrations from the recording medium which are converted into sound by the relative movement of the speaker cone 6 are translated directly to the speaker cone 6 through its connection with the speaker link 114 and the ball joint apex 12. The lower portion of the speaker link 114 is universally or swivelly coupled into the coupling member 112 of the stylys mounting arm 104.

The stylus or needle 108 is mounted on the mounting arm 104 adjacent a pair of flexure or living hinges 106 that pivotally connect the needle mounting arm 104 to the tone arm body 96. As the tip of the stylus or needle 108 tracks a modulated spiral path along the walls of the record grooves, the side to side or horizontal movement is amplified as it is translated to the speaker link 114 by virtue of the pivotal movement of the mounting arm 104. The elongated body 96 of the tone arm 62 provides a relatively stationary or stable platform by virtue of the pressurized contact of the pawl 58 with the arcuate tone arm stop member 226. Altough not necessary, it is possible to utilize a grease connection between the pawl 58 and the arcuate stop member 226 such as a silicone grease.

The induced movement of the point of the stylus or needle 108 is adequately magnified and transmitted through the length of the needle mounting arm 104 and through the joint coupling member 112. The spherical mounting or ball joint 12 at the apex of the speaker cone 6 is sufficiently secure to provide a snap-in engagement with the speaker link 114 and to adequately transmit all of the induced stylus point movement directly to the speaker cone 6. The rim 18 of the top housing 10 with the assistance of either the speaker grill 4 or by itself with an appropriate adhesive further provides a stable or stationary base for the suspension of the speaker cone 6.

5. Operation of the Voice Unit

The operation of the voice unit 2 will be described with reference to the dual turntable arrangement disclosed in the drawings although it should be realized that a single turntable could also be utilized.

Referring to FIGS. 4, 6 and 7, the inner turntable 126 is mounted within the ouer turntable 136 and is free to move relative to the outer turntable 136 in one direction during the pulling of the pull string 32 while being held fast in the other direction during the sound reproduction. The respective surfaces of each of the turntables can support an appropriate spirally grooved record disk as shown in FIG. 6. Generally, the turntables 126 and 136 will be made from a nylon material and can as a highly advantageous alternative embodiment have a plurality of individual interleaving spiral grooves 232 cut directly into the respective turntable surfaces as shown in FIG. 7, thus removing the necessity of separate record disks.

FIG. 6 is shown with a pair of conecntric flat record discs 228 and 230, but it should be understood that inner and outer turntables 126' and 136' can carry the sound tracks.

Each of the sound grooves will provide a separate sound track on which can be recorded a distinctive sound such as a phrase or part of a sentence. The sound tracks on the outer record 228 can each introduce or start a sentence while the distinctive sounds recorded on the inner spiral record grooves 212 of the inner record 230 can be complementary to any one of the outer sounds and thus finish the sentence. Thus, as an illustration, one of the outer spiral record grooves 210 can contain the phrase "Baby wants" while any one of the inner spiral record grooves 212 will have a complementary phrase such as "a new red bicycle", "a friend to play with", "a new dress for Christmas ". As can be readily appreciated, the total number of distinct complete sound sequences capable of being reproduced on the voice unit 2 is a function of the number of outer spiral record grooves 210 multiplied by the number of the inner spiral grooves 212.

Since the spiral record grooves 210 have initial starting positions staggered about the outer periphery edge, the production of sound will begin promptly upon a release of the pull string 32 after it is pulled by the operator.

The spiral sound tracks can be of either a horizontal lateral indicia groove system or even a hill-and-dale type. Generally, the lateral horizontal groove system has a higher sound fidelity potential, since the stylus or needle 108 is both pushed and pulled in the horizontal plane instead of being only pushed upward in the vertical plane. It is believed that most voice units in the prior art have been forced to accept a hill-and-dale system since they were generally incapable of providing a relatively inexpensive but efficient voice unit with a side-to-side arrangement.

The outer record 228 has its spiral record grooves 210 starting from the outer peripheral edge and terminating directly at the inner peripheral record edge to let the stylus point fall off of the outer record 228 under the pressure of spring 102. This particular arrangement of grooves is believed to be unique and facilitates the movement of the stylus or needle 108 from the outer record 228 onto the inner ring record 230. The inner record 230 likewise has similarly arranged spiral grooves 212 which can conveniently end on a respective common inner peripheral groove (not shown).

Referring to FIG. 7, the camming ramp 110 on the stylus or needle mounting arm 104 insures that the stylus or needle 108 will not become stuck in the gap existing between the inner record 230 and the outer record 228. The camming ramp 110 is proportioned to contact the inner edge of the outer record 228 and to translate the stylus 108 as it passes or falls off of the inner edge of the outer record 228. By providing for the particular camming translation of the stylus 108, the relative alignment of the inner edge of the outer record 228 and the outer edge of the inner record 230 need not be precise or even close in proximity. Likewise, the turntables 126' and 136' shown in FIG. 7 can be roughly aligned during assembly since the stylus point is effectively lifted over and inwardly across the outer peripheral edge of turntable 126' and will not become trapped by the interface gap between the turntable or records. The translation is relatively quick and does not interfere with the continuity of the complete voice sequence perceived by the listener which includes the sounds of the inner and outer records combined. The exact shape of the camming surface or ramp 110 is determined as a function of the relative vertical height between the records or turntables and the desired horizontal translation distance.

When an operator grasps the ring 34 of the pull string 32 and pulls it away from the combined voice unit housing members 10 and 86 he also turns the string spool 118 and correspondingly the string spindle 152 to reverse wind the negator or the constant tension spring 156 from its spiral coiled position to a position about the ring portion 154 of the string spindle 152. During this operation, the tension of the string 132 pulls the reset arm 48, as shown in FIG. 8, to reset the tone arm 62 adjacent the outer peripheral edge of the outer record 228. During the pulling operation of the pull string 32, the inner turntable 126 and its corresponding inner record disk 230 can be rotated relative to the outer turntable 136 and the outer record 228. Upon release of the pull string 32, the constant tension spring 156 releases its energy to drive both the inner and outer turntables 126 and 136 and their corresponding records at the same speed.

It should be realized that the voice unit 2 of the present invention can accommodate various indexing systems or mechanisms to permit the operator to discretely select a particular sound track or combination of sound tracks.

Various modifications of the other features of the present invention are possible by a person skilled in the art. For example, FIG. 9 discloses an alternative embodiment of the present invention wherein the mechanical linkage system between the stylus mounting arm 104 and the speaker cone 6 includes a pair of flexure or "living" hinges 236 and 238 instead of the respective ball and joint couplings 12 and 112. The speaker cone 6' is appropriately modified to be secured to the link portion 114' and the link portion 114' can be bifurcated to facilitate molding. The axis or plane about which the hinges 236 and 238 rotate are appropriately aligned with the pivot point of the tone arm 62. This arrangement facilitates assembly and permits an integral molding of the linkage system.

It should be noted that various modifications can be made to the apparatus while still remaining within the purview of the following claims.

What is claimed is:

1. A sound unit for producing sound sequences having at least a first movable record member driven by power means through a drive train, said drive train including:
   a ring gear;
   a sun gear, one of the ring and sun gears being operatively connected to the movable record member;
   a planetary gear meshing with said ring gear and sun gear; and
   a carrier member located adjacent to the planetary gear member for permitting relative rotation of the ring and sun gears in one direction while locking the ring and sun gear together for movement in the other direction,
   a second movable record member relatively movable to the first record member, the carrier member being operatively connected to the second record member.

2. A sound unit as claimed in claim 1, said carrier means including a stop member on one side of the planetary gear for locking the planetary, ring and sun gears together.

3. A sound unit as claimed in claim 1, said carrier means further including a retaining wall member for permitting relative rotation of the ring and sun gears when the planetary gear member rotates against the retaining wall.

4. A sound unit as claimed in claim 1, said ring gear being fixedly mounted on the first record member.

5. A sound unit as claimed in claim 4, said sun gear being operatively connected to the power means.

6. A sound unit as claimed in claim 4, said ring gear being integrally molded on the first record member.

7. A sound unit as claimed in claim 4, said first record member defining a disk having a recessed cavity with peripheral ring teeth forming the ring gear, the surface of the cavity between the teeth providing a guide surface for the planetary gear.

8. A sound unit as claimed in claim 7, said carrier member including a stop member, and a retaining wall extending into the cavity on either side of the planetary gear, the second record member movably mounted within the first record member.

9. A sound unit for producing a plurality of combined sound sequences comprising:
   a first record member having a plurality of separate sound sequences on a respective plurality of individual sound tracks;
   a second record member having a plurality of separate sound sequences on a respective plurality of individual sound tracks, the second record member mounted relative to the first record member to permit relative movement for varying the relative position of the respective sound tracks;
   sound pickup means for contacting the first and second member to transmit a combination of the sound sequences;
   drive means for driving the first and second record members relative to the pickup means when energized; and
   means for transmitting energizing power to the drive means including means for moving one record member relative to the other record member at least during a portion of the power transmission to the drive means, wherein a plurality of different combined sound sequences can be produced when the drive means rotates the first and second record means, said power transmitting means including a carrier member that is connected to said second record member and that is operative to provide for relative movement of said record members in one direction and for locking said record members for concurrent movement together in the other direction.

10. A sound unit as claimed in claim 9, said drive means including a member for locking the first and second record members together during the reproduction of the sound sequences.

11. A sound unit as claimed in claim 9, said means for transmitting power including a pull string, and a connecting member moving one of the record members relative to the other record member during the activation of the pull string by an operator.

12. A sound unit for producing a plurality of combined sound sequences comprising:
   a first record member having a plurality of separate sound sequences on a respective plurality of individual sound tracks;
   a second record member having a plurality of separate sound sequences on a respective plurality of individual sound tracks, the second record member mounted relative to the first record member to permit relative movement for varying the relative position of the respective sound tracks;
   sound pickup means for contacting the first and second member to transmit a combination of the sound sequences;
   drive means for driving the first and second record members relative to the pickup means when energized;
   means for transmitting energizing power to the drive means including means for moving one record member relative to the other record member at least during a portion of the power transmission to the drive means, wherein a plurality of different combined sound sequences can be produced when the drive means rotates the first and second record means;
   a ring gear;
   a sun gear, one of the ring and sun gears operatively connected to the first record member;
   a planetary gear meshing with the ring gear and the sun gear, and a carrier means adjacent to the planetary gear member connected to the second record member for permitting relative rotation of the ring and sun gears in one direction while locking the ring and sun gear together in the other direction, whereby the first and second record members are moved relative to each other in one direction and locked together for concurrent movement in the other direction.

13. A sound unit as claimed in claim 12, said first record member defining a disk having a recessed cavity with peripheral ring teeth forming the ring gear, the surface of the cavity between the teeth providing a guide surface for the planetary gear.

14. A sound unit as claimed in claim 13, said carrier member including a stop member and a retaining wall extending into the cavity on either side of the planetary gear, the second record member being movably mounted within the first record member.

15. A sound unit for producing a plurality of combined sound sequences from a sound indicia medium such as a record and the like comprising:
- a first record member having a plurality of separate sound sequences on a respective plurality of individual sound tracks;
- a second record member having a plurality of separate sound sequences on a respective plurality of individual sound tracks, the second record member being mounted separately from the first record member so that their respective surface edges are displaced from each other;
- means for moving one of the record members relative to the other record member for varying the relative position of the respective sound tracks;
- speaker means for broadcasting sound;
- stylus means for contacting sound tracks on the first and second member to transmit a combination of the sound sequences to the speaker means;
- camming means on a stylus means for translating the stylus means between the respective surfaces of the first and second record member, said camming means contacting the edge of one of the record members to translate the stylus means across the other record member's surface, thereby preventing any binding of the stylus means between the record members.

16. A sound unit as claimed in claim 15, said camming means being mounted adjacent to the contact point of the stylus means and the sound indicia medium.

17. A sound unit as claimed in claim 16, said record members being flat cylindrical disks concentrically mounted for rotation.

* * * * *